(12) United States Patent
Andrews et al.

(10) Patent No.: US 8,644,137 B2
(45) Date of Patent: Feb. 4, 2014

(54) METHOD AND SYSTEM FOR PROVIDING SAFE DYNAMIC LINK REDUNDANCY IN A DATA NETWORK

(75) Inventors: Robert Andrews, Morgan Hill, CA (US); Navindra Yadav, San Jose, CA (US); Shree Murthy, San Jose, CA (US); Gnanaprakasam Pandian, Cupertino, CA (US); Murali Duvvury, Santa Clara, CA (US); Sudhakar Padavala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1124 days.

(21) Appl. No.: 11/353,312

(22) Filed: Feb. 13, 2006

(65) Prior Publication Data

US 2007/0189157 A1    Aug. 16, 2007

(51) Int. Cl.
*H04L 12/26* (2006.01)

(52) U.S. Cl.
USPC ............................. 370/228; 370/255; 709/239

(58) Field of Classification Search
USPC ......... 370/216, 225, 228, 254, 255, 226, 227, 370/229, 235, 237, 238, 464, 465; 709/238, 709/239, 243, 244; 710/100, 305, 316
See application file for complete search history.

(56) References Cited

U.S. PATENT DOCUMENTS

| | | | |
|---|---|---|---|
| 5,600,631 A * | 2/1997 | Takatori et al. | ............... 370/217 |
| 5,781,549 A | 7/1998 | Dai | |
| 6,032,194 A * | 2/2000 | Gai et al. | ....................... 709/239 |
| 6,072,806 A * | 6/2000 | Khouri et al. | .................. 370/465 |
| 6,144,638 A | 11/2000 | Obenhuber et al. | |
| 6,415,312 B1 | 7/2002 | Boivie | |
| 6,463,061 B1 | 10/2002 | Rekhter et al. | |
| 6,618,371 B1 * | 9/2003 | Cao | ............................... 370/388 |
| 6,711,152 B1 | 3/2004 | Kalmanek et al. | |
| 6,717,913 B1 | 4/2004 | Ghahremani et al. | |

(Continued)

FOREIGN PATENT DOCUMENTS

EP        06826300.3       10/2009
GB        2425688 A    *  11/2006

OTHER PUBLICATIONS

Cisco Systems, Product Bulletin No. 2711, "New Cisco Software Release 12.2(25)SEA for Cisco Catalyst 3750, 3560, 3550, and 2970 Series Switches", 2005.*

(Continued)

*Primary Examiner* — Yemane Mesfin
*Assistant Examiner* — Khoa Huynh
(74) *Attorney, Agent, or Firm* — Novak Druce Connolly Bove + Quigg LLP (57) ABSTRACT

Method and system for providing dynamic configuration of link redundancy in data network based on detection of dynamic changes in the network topology including the steps of detecting data network topology, determining a number of data paths from a node in the data network topology to each of a respective pair of peer nodes coupled to the node by a corresponding interface, determining a data path in the data network topology between the peer nodes, calculating a set of nodes reachable via each interface coupled to the node and the respective peer node in the data network topology, and comparing the set of calculated nodes is provided.

24 Claims, 6 Drawing Sheets

(56) References Cited

U.S. PATENT DOCUMENTS

| | | | |
|---|---|---|---|
| 6,728,205 B1* | 4/2004 | Finn et al. | 370/217 |
| 6,768,718 B1* | 7/2004 | Beshai et al. | 370/237 |
| 6,778,492 B2 | 8/2004 | Charny et al. | |
| 6,829,221 B1 | 12/2004 | Winckles et al. | |
| 6,952,396 B1* | 10/2005 | Cottreau et al. | 370/222 |
| 7,036,051 B1 | 4/2006 | Fernandes | |
| 7,076,594 B2* | 7/2006 | Benedetto et al. | 710/316 |
| 7,093,027 B1 | 8/2006 | Shabtay et al. | |
| 7,123,587 B1 | 10/2006 | Hass et al. | |
| 2002/0032029 A1 | 3/2002 | Angin | |
| 2002/0093954 A1 | 7/2002 | Weil et al. | |
| 2002/0133756 A1 | 9/2002 | Jain | |
| 2002/0150041 A1 | 10/2002 | Reinshmidt et al. | |
| 2002/0163882 A1 | 11/2002 | Bornstein et al. | |
| 2002/0172155 A1 | 11/2002 | Kasvand-Harris et al. | |
| 2003/0007500 A1 | 1/2003 | Rombeaut et al. | |
| 2003/0012145 A1 | 1/2003 | Bragg | |
| 2003/0016678 A1 | 1/2003 | Maeno | |
| 2003/0063613 A1 | 4/2003 | Carpini et al. | |
| 2003/0088698 A1 | 5/2003 | Singh et al. | |
| 2003/0097643 A1 | 5/2003 | Saito | |
| 2003/0110288 A1 | 6/2003 | Ramanujan et al. | |
| 2003/0112809 A1 | 6/2003 | Bharali et al. | |
| 2003/0152027 A1 | 8/2003 | Takagi | |
| 2003/0233595 A1* | 12/2003 | Charny et al. | 714/4 |
| 2004/0034702 A1 | 2/2004 | He | |
| 2004/0090913 A1 | 5/2004 | Scudder et al. | |
| 2004/0156310 A1 | 8/2004 | Fredette et al. | |
| 2004/0218525 A1* | 11/2004 | Elie-Dit-Cosaque et al. | 370/223 |
| 2005/0007954 A1 | 1/2005 | Sreemanthula et al. | |
| 2005/0025058 A1* | 2/2005 | Chaudhuri et al. | 370/238 |
| 2005/0088965 A1* | 4/2005 | Atlas et al. | 370/216 |
| 2005/0097219 A1 | 5/2005 | Goguen et al. | |
| 2005/0152269 A1 | 7/2005 | Liu | |
| 2006/0047851 A1* | 3/2006 | Voit et al. | 709/239 |
| 2006/0067210 A1 | 3/2006 | Liu et al. | |
| 2006/0159076 A1 | 7/2006 | Bless et al. | |
| 2006/0165009 A1 | 7/2006 | Nguyen et al. | |
| 2006/0200579 A1 | 9/2006 | Vasseur et al. | |
| 2006/0274647 A1* | 12/2006 | Wang et al. | 370/216 |
| 2006/0274718 A1 | 12/2006 | Butenweg et al. | |
| 2007/0053284 A1 | 3/2007 | Hu | |
| 2007/0076590 A1* | 4/2007 | Galpin et al. | 370/216 |
| 2007/0091795 A1* | 4/2007 | Bonaventure et al. | 370/228 |

OTHER PUBLICATIONS

Bouillet et. al, "Stochastic Approaches to Compute Shared Mesh Restored Lightpaths in Optical Network Architectures", IEEE Infocom, 2002, p. 801-807.*

Rosen, E., et al., "BGP/MPLS VPNs", Network Working Group Request for Comments: 2547, Mar. 1999, pp. 1-24.

Gummadi, K. P., et al., "Improving the Reliability of Internet Paths with One-hop Source Routing", USENIX Association, OSDI '04: 6th Symposium on Operating Systems Design and Implementation, Dec. 6-8, 2004, pp. 183-197.

"Fast Scoped Rerouting for BGP", International Conference on Networks, IEEE, Sep. 2003, pp. 25-30.

Lichtwald, et al., "Fast Scoped Rerouting for BGP", ICON 2003, Institute of Telematics, University of Karlsruhe, Germany, pp. 1-15.

Walton, D., et al., "Advertisement of Multiple Paths in BGP (draft-walton-bgp-add-paths-03.txt)", Network Working Group Internet Draft, Jul. 2005, pp. 1-8.

U.S. Appl. No. 11/254,469, filed Oct. 20, 2005, entitled a Method for Constructing a Backup Path in an Autonomous System, by Clarence Filsfils, et al.

U.S. Appl. No. 11/254,609, filed Oct. 20, 2005, entitled A Method of Implementing a Backup Path in an Autonomous System, by Clarence Filsfils, et al.

U.S. Appl. No. 11/254,468, filed Oct. 20, 2005, entitled Method and Apparatus for Managing Forwarding of Data in an Autonomous System, by Clarence Filsfils, et al.

U.S. Appl. No. 10/340,371, filed Jan. 9, 2003, entitled Method and Apparatus for Constructing a Backup Route in a Data Communications Network, by Kevin George Miles, et al.

PCT Notification of Transmittal of the International Search Report and the Written Opinion of the International Searching Authority, or the Declaration, International Application No. PCT/US06/40929, International Filing Date: Oct. 18, 2006, Date of Mailing: Jul. 16, 2007, 9 pgs.

Bagnulo, et al., "Multi-Homing Tunnel Broker", IEEE, Proceedings of the 30$^{th}$ EUROMICRO Conference (EUROMICRO'04), Rennes, France, Aug./Sep. 2004, 8 pages.

Pelsser, et al., "Extending RSVP-TE to Support Inter-AS LSPs", 2003 Workshop on High Performance Switching and Routing (HPSR 2003), Jun. 24-27, 2003, Piscataway, NJ, pp. 79-84.

Labourdette, Jean-Francois, et al., "Invited: Routing Strategies for Capacity-Efficient and Fast-Restorable Mesh Optical Networks," Photonic Network Communications, 4:3/4, Kluwer Academic Publishers, Netherlands, Oct. 23, 2001, pp. 219-235.

* cited by examiner

METHOD AND SYSTEM FOR PROVIDING SAFE DYNAMIC LINK REDUNDANCY IN A DATA NETWORK

FIELD OF THE INVENTION

The present invention relates to data network management. More specifically, the present invention relates to safe dynamic configuration of flexlink feature in a data network.

BACKGROUND

Flexlink is a pair of a Layer 2 interfaces such as switchports or port channels, where one interface may be configured to operate as a backup interface to the other interface. This approach provides an alternative option to the Spanning Tree Protocol (STP) by allowing the users to turn off STP and still retain basic network link redundancy. Flexlinks are generally configured in service provider or enterprise networks where it is not desirable to run STP on the network switch. Indeed, STP is disabled on flexlink interfaces. Flexlinks also provides faster convergence than STP.

Generally, flexlinks may be configured on one Layer 2 interface (the active link) by assigning another Layer 2 interface as the flexlink or backup link. When one of the links is up and forwarding traffic, the other link is configured on standby mode, ready to begin forwarding data traffic if the other link shuts down. At any given time, only one of the interfaces is forwarding data or traffic. If the primary link shuts down, the standby link starts forwarding traffic, and when the active link comes back up, it goes into standby mode.

In general, only one flexlink backup link may be configured for any given active link, and is a different interface from the active interface. Also, an interface can be associated to only one flexlink pair—that is, an interface may be configured as a backup link for only one active link in the network, and further, an active link cannot belong to another flexlink pair.

More over, neither of the active and backup links forming the flexlink pair can be a port that belongs to an EtherChannel (but two port channels (e.g., EtherChannel logical interfaces) may be configured as flexlinks, and a port channel and a physical interface may be configured as flexlinks with either the port channel or the physical interface as the active link. Additionally, the backup link does not have to be the same type (for example, Fast Ethernet, Gigabit Ethernet, or port channel) as the active link. However, to minimize the potential for loops or changes in behavior if the standby link begins to forward traffic, it is desirable to configure both flexlinks with similar characteristics.

Notwithstanding, configuration of flexlink feature is error prone, and trivial configuration or cabling errors leads to loops which may lead to network meltdown. Moreover, minor procedural errors can generate a lock out, and each network device has different subtle limitations is constraints, thus making the flexlink configuration procedure challenging.

In view of the foregoing, it would be desirable to have methods and systems for providing automatic configuration of flexlink feature in a data network which is automatically turned on and/or based on dynamic changes to the network topology.

SUMMARY OF THE INVENTION

A method of providing dynamic link redundancy configuration in a data network in one embodiment of the present invention includes the steps of detecting a topology of a data network, determining a number of data paths from a node in the data network topology to each of a respective pair of peer nodes coupled to the node by a corresponding interface, determining a data path in the data network topology between the peer nodes, calculating a set of nodes reachable via each interface coupled to the node and the respective peer node in the data network topology, and comparing the set of calculated nodes.

The pair of interfaces in one embodiment may include layer 2 interfaces.

The method in a further embodiment may also include the step of configuring the pair of interfaces as a redundant link pair for the node in the data network if (1) the pair of interfaces is the only data path between the node and any of the peer nodes, (2) the pair of interfaces are not the only data path between the peer nodes, and (3) the set of nodes within the network topology reachable via each interface is the same.

In one embodiment, the-redundant link pair may include a flexlink pair in the data network topology.

The method in a further embodiment may include the step of detecting a change in the data network topology.

The step of determining the number of data paths from the node to each respective peer nodes in still another embodiment may include the step of verifying data network topology to avoid network loops. Also, the step of determining the data path between the peer nodes in yet a further embodiment may include the step of verifying network connectivity symmetry for each of the pair of interfaces for the node.

Moreover, the step of calculating and comparing the set of nodes in yet still another embodiment may include the steps of verifying symmetrical reachability of the pair of interfaces, and confirming compatibility with an enabled redundant link pair in the data network topology.

The method in yet a further embodiment may include the steps of detecting an enabled redundant link pair in the data network topology, and verifying connectivity between the two sides of the detected existing redundant link pair.

The verifying step may include the steps of confirming data network topology connectivity between the two sides of the detected enabled redundant link pair without traversing the detected enabled redundant link pair and without traversing the respective interfaces coupling the peer nodes to the node.

The detected existing redundant link pair may include an enabled flexlink in the data network topology.

A method of dynamically configuring link redundancy in a data network in accordance with another embodiment of the present invention includes the steps of monitoring a topology of a data network, for each node coupled to a pair of peer nodes by a respective interface in the data network topology, (1) determining a number of data paths from the node to each peer node, (2) determining a data path between the pair of peer nodes, (3) calculating a set of nodes reachable via each interface coupled to the node and the respective peer node, (4) comparing the set of calculated nodes, and configuring the pair of interfaces coupling the respective peer nodes to the node in the data network topology as a redundant link pair.

The configuration step may include the step of enabling the pair of interfaces as a redundant link pair if, the pair of interfaces is the only data path between the node and any of the peer nodes, the pair of interfaces are not the only data path between the peer nodes, and the set of compared nodes reachable via each interface is the same.

A system for providing dynamic link redundancy configuration in a data network in accordance with yet another embodiment of the present invention includes a data network, and a controller unit coupled to the data network, configured to dynamically detect a topology of the data network, wherein the controller unit is further configured to determine a number of data paths from a node in the data network topology to each of a respective pair of peer nodes coupled to the node by a corresponding interface, determine a data path in the data network topology between the peer nodes, calculate a set of nodes reachable via each interface coupled to the node and the respective peer node in the data network topology, and compare the set of calculated nodes.

The controller unit may be further configured to configure the pair of interfaces as a redundant link pair for the node in the data network if the pair of interfaces is the only data path between the node and any of the peer nodes, the pair of interfaces are not the only data path between the peer nodes, the set of nodes within the network topology reachable via each interface is the same.

In another embodiment, the controller unit may be further configured to detect an enabled redundant link pair in the data network topology, and verify connectivity between the two sides of the detected existing redundant link pair.

Moreover, in still another embodiment, when the controller unit is configured to verify connectivity, the controller unit may be further configured to confirm the data network topology connectivity between the two sides of the detected enabled redundant link pair without traversing the detected enabled redundant link pair and without traversing the respective interfaces coupling the peer nodes to the node.

The detected existing redundant link pair may include an enabled flexlink in the data network topology.

Indeed, with the central controller unit of the network having complete knowledge of the network topology as well as dynamic changes thereto, and with the central controller considering the links between each node in the network for flexlink applicability in Layer 2 network cloud (where the center of the Layer 2 network cloud is well defined), in accordance with one embodiment of the present invention, the central controller determines the suitability of the flexlink enabling as between various coupled nodes such that the appropriate flexlinks are automatically enabled and/or disabled based on changes to the network topology, eliminating the potential for loop formation and providing network stability.

These and other features and advantages of the present invention will be understood upon consideration of the following detailed description of the invention and the accompanying drawings.

DETAILED DESCRIPTION

Figure 1:
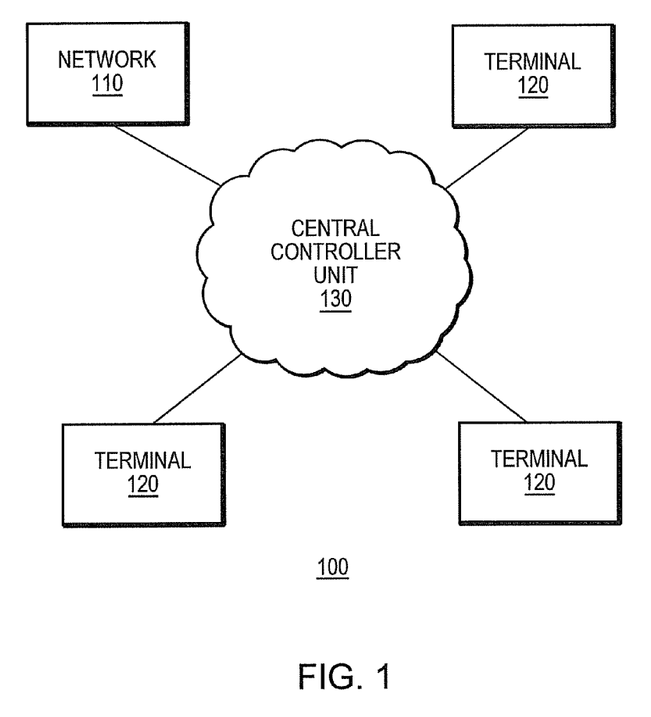
FIG. 1 is a block diagram of an overall data network for practicing one or more embodiments of the present invention.

FIG. 1 is a block diagram of an overall data network for practicing one or more embodiments of the present invention. Referring to FIG. 1 as can be seen, a data network 100 includes a central controller 130 operatively coupled to one or more network terminals 120 and also to one or more networks 110. In one embodiment, the central controller 130 is configured to determine or learn the topology of the data network 100, and further, the central controller 130 detects any changes in the topology of the data network 100.

In one embodiment, the central controller 130 is configured to determine the applicability of flexlink for each node in the layer 2 network cloud, where the center of the layer 2 could in the data network 100 is well defined. As discussed in further detail below, the central controller 130 is configured to determine the applicability of each flexlink pair candidates on each node of the data network 100, and further, to automatically activate the flexlink pair on a given node in the data network 100 if it is determined that the flexlink pair can be activated without potentially degrading the integrity of the data network 100 (for example, by creating undesirable loops).

Figure 2:
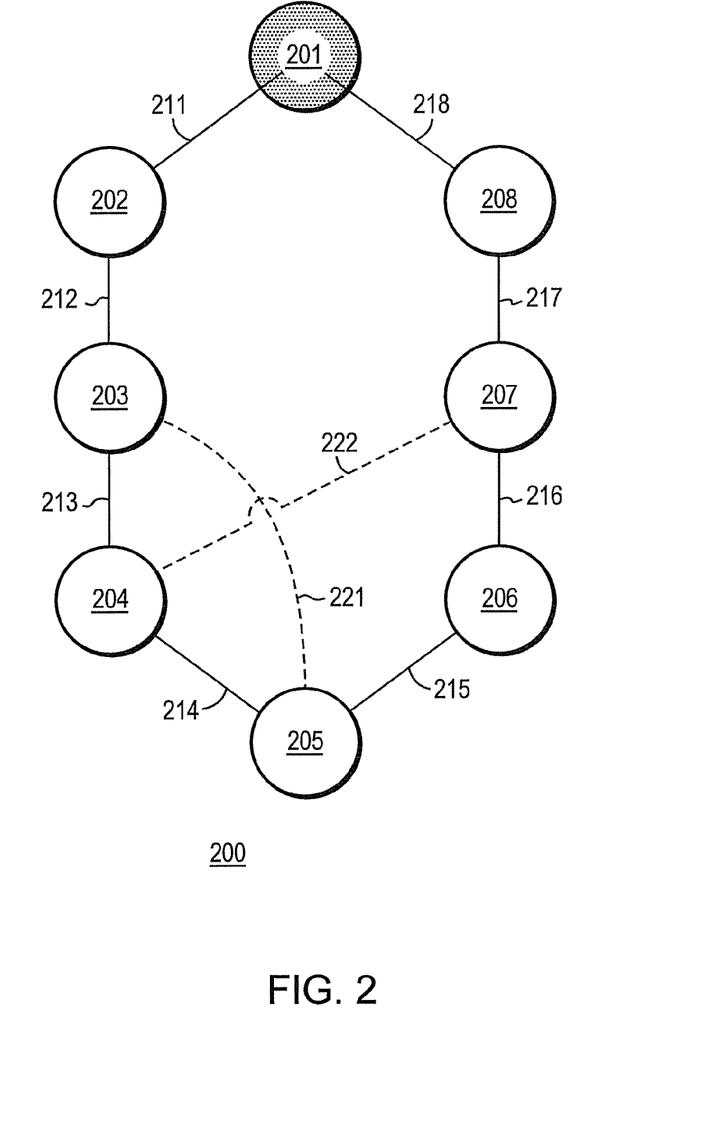
FIG. 2 is an exemplary network topology for practicing one or more embodiments of the present invention.

FIG. 2 is an exemplary network topology for practicing one or more embodiments of the present invention. Referring to FIG. 2, the network topology 200 shown in the Figure includes a plurality of nodes 201-208, where each of the nodes 201-208 are coupled to a respective another one of the nodes 201-208 as shown. For example, it can be seen from FIG. 2 that node 201 which in this example is assumed to be the center of the network topology 200, is coupled to node 202 by the link 211, while the node 201 is further coupled to the node 208 by link 218. Moreover, it can be seen from FIG. 2 that node 202 is also coupled to node 203 by link 212, while node 203 is in turn further coupled to node 204 by link 213.

Referring back to FIG. 2, node 204 is further coupled to node 205 by link 214, while node 205 is in turn coupled to node 206 by link 215. Additionally, node 206 is coupled to node 207 by link 216, and finally, node 207 is further linked to node 208 by link 217. In this manner, in the network topology 200 shown in FIG. 2, each node is linked to two other nodes by a respective separate link, and further, there is symmetry in connection between node 201 and node 205 in either direction. In conjunction with FIGS. 3-6 below, the process of determining the applicability of the flexlink pairs in the network topology 200 (FIG. 2) to automatically configure the flexlink pairs where appropriate, is described in detail below.

Figure 3:
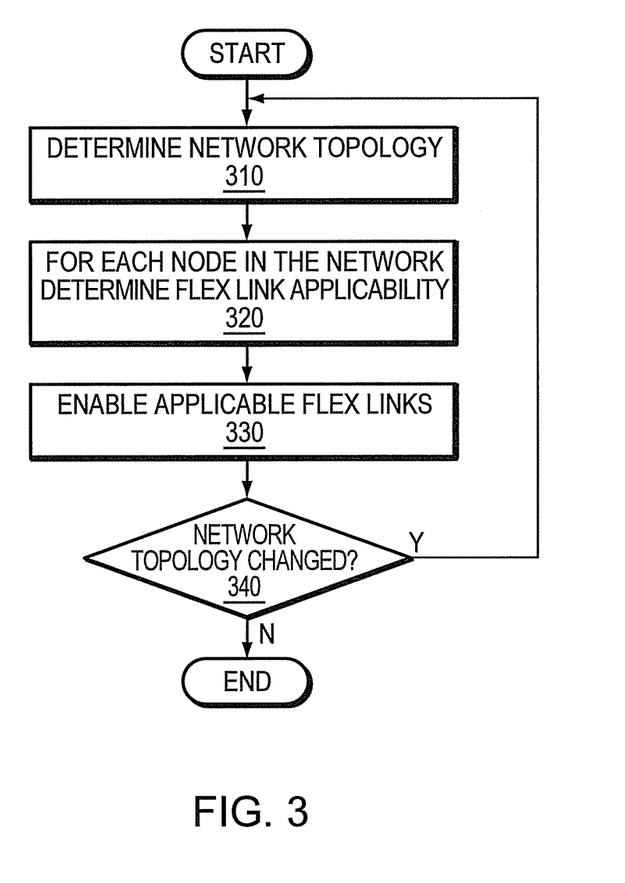
FIG. 3 is a flowchart illustrating the configuration of flexlink activation determination in accordance with one embodiment of the present invention.

FIG. 3 is a flowchart illustrating the configuration of flexlink activation determination in accordance with one embodiment of the present invention. Referring to FIGS. 2 and 3, at step 310, the network topology is first determined with respect to the center of the network. For example, the topology of the network as shown in FIG. 2 indicating the links between the various nodes in the network is first determined at step 310 (FIG. 3). Thereafter, at step 320, each node is separately considered for flexlink applicability so as to determine whether the flexlink pair candidate links of each node under consideration can be safely turned on without potentially creating undesirable conditions (such as loops or conflicts). For example, referring back to FIG. 1, in one embodiment, the central controller 130 is configured to determine the network topology under consideration (for example, as set forth in step 310 of FIG. 3), and thereafter, determine the flexlink pair applicability for each node under consideration for the given network (for example, as shown in step 320 of FIG. 3).

Detailed description of the approach within the various embodiments of the present invention in determining whether the flexlink pair candidates are applicable for the particular node under consideration, such that it is appropriate to turn on the flexlink for the particular link pair of the node under consideration is provided below in conjunction with FIGS. 4-6.

Referring back to FIG. 3, after each node and its links to other nodes have been considered for flexlink applicability at step 320, the applicable flexlinks for each node under consideration within the network is turned on at step 330. Thereafter, at step 340, the network topology is monitored for any change, and if it is determined that the network topology has changed, then the procedure returns to step 310. In one embodiment, the central controller 130 (FIG. 1) is configured to monitor the network topology and to detect any change in the data network 100. When a change in the network topology is detected, the central controller 130 (FIG. 1) in one embodiment is configured to perform the flexlink applicability determination as described above in conjunction with FIG. 3, and thereafter, turns on any flexlink pairs which are determined to be applicable and suitable given the change in the network topology.

Figure 4:
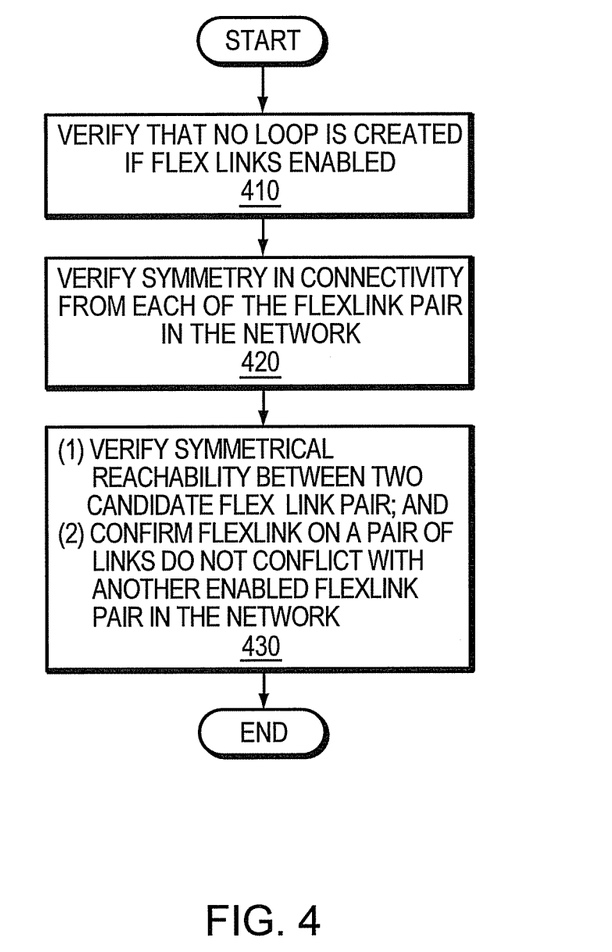
FIG. 4 is a flowchart illustrating the flexlink activation determination of step 320 as shown in FIG. 3 in accordance with one embodiment of the present invention.

FIG. 4 is a flowchart illustrating the flexlink activation determination of step 320 as shown in FIG. 3 in accordance with one embodiment of the present invention. Referring to FIGS. 3 and 4, with the network topology determined at step 310 (FIG. 3), for the given node under consideration in the network, it is determined at step 410 whether any loop would be created in the topology if the flexlink pair candidates of the node under consideration is enabled. More specifically, in one embodiment, it is determined whether a path between the node under consideration and any of the peer nodes in the network topology without using the flexlink pair candidates of the node under consideration. As discussed in further detail below in conjunction with FIG. 5, if it is determined that there exists a path between the node under consideration and any of the peer nodes (i.e., nodes directed coupled to the node under consideration—for example, in FIG. 2, nodes 202 and 208 would be peer nodes to node 201) in the network topology without using the flexlink pair candidates of the node under consideration, enabling the flexlink pair candidates for the node under consideration may result in the network degradation or meltdown as the Spanning Tree Protocol is not aware of the enabled flexlink pair and may open the alternate links (i.e., path between the node under consideration and the peer nodes without using the flexlink pair candidates) for forwarding, and resulting is a loop.

Referring again to FIG. 4, after confirming at step 410 that no loop is created if the flexlink pair candidates of the node under consideration is enabled, at step 420, connectivity symmetry is verified from each of the flexlink pair candidates in the network topology. More specifically, at step 420, by verifying symmetry in connectivity from each of the flexlink pair candidate nodes, access to each node in the network topology is assured in the event the flexlink pair candidates is enabled. Finally, at step 430, the symmetrical reachability between the two flexlink pair candidate nodes is verified, and further, in the event an enabled flexlink pair is encountered, that the flexlink pair candidates do not conflict with the enabled flexlink pair in the network.

Figure 5:
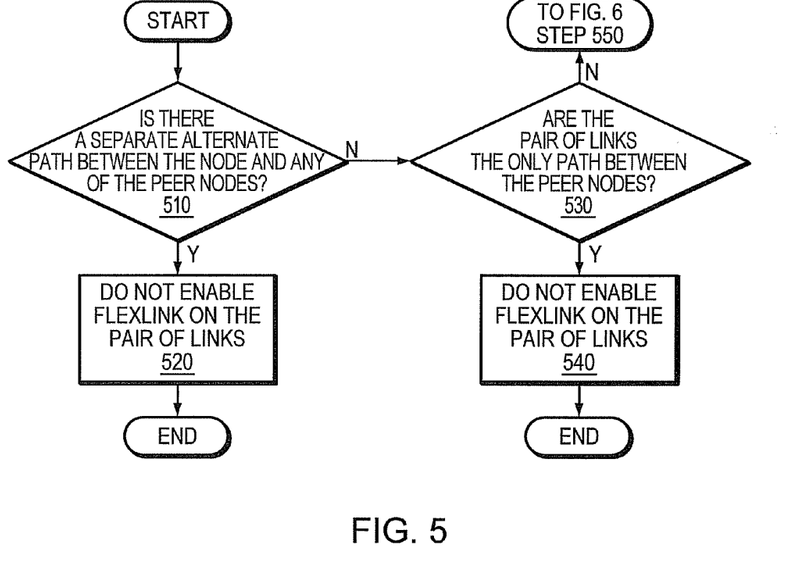
FIG. 5 is a flowchart illustrating the steps of confirming that loop exists in the network, and verifying connectivity symmetry in the network of steps 410 and 420 respectively, of FIG. 4 in one embodiment of the present invention.

FIG. 5 is a flowchart illustrating the steps of confirming that loop exists in the network, and verifying connectivity symmetry in the network of steps 410 and 420 respectively, of FIG. 4 in one embodiment of the present invention. Referring to FIG. 5, at step 510, it is determined whether there is a separate alternate path between the node under consideration in the network topology and any of its peer nodes. For example, referring back to FIG. 2, given that node 205 is under consideration, the flex link pair candidates are links 214 and 215.

Thus, at step 510 in FIG. 5, it is determined whether there is a link between node 205 (node under consideration) and its peer nodes (node 204 and 206) without using the flexlink pair candidates (i.e., links 214 and 215). It can be seen from FIG. 2, that there is no path between node 205 and its peer nodes 204 and 206, without using the flexlink pair candidate links 214 and 215. If this condition is not met, however, then the flexlink pair candidates (links 214 and 215) for node 205 under consideration cannot be enabled as a loop will be created if the flexlink pair candidates are enabled.

For example, in the network topology shown in FIG. 2, if there existed an alternate link between node 205 and node 203 (shown by the dotted line 221), it can be seen that a link does exist (link 221) between node 205 (node under consideration) and one of its peer nodes (node 204) without using the flexlink pair candidates (i.e., links 214 and 215). That is, there is an alternate path between node 205 and its peer node 204 via the alternate link 221 to node 203, and then to node 204 via existing link 213. In this case, if the flexlink pair candidates of node 205 were enabled, then a loop will be created in the network topology causing a network to degrade and possibly shutdown.

Referring back to FIG. 5, as discussed above, if at step 510 it is determined that there is an alternate path between the node under consideration and any of its peer nodes, then at step 520, it is determined that the flexlink pair candidates on the node under consideration cannot be enabled, and the routine terminates for the node under consideration.

On the other hand, if at step 510 it is determined that no alternate path exists between the node under consideration and any of its peer nodes without using the flexlink pair candidate links for the node under consideration, then at step 530, it is determined whether the flexlink pair candidate links are the only path between the peer nodes of the node under consideration. For example, referring back again to the network topology shown in FIG. 2, for the node 205 under consideration, it is determined whether there exists a path between the peer nodes 204 and 206 without traversing the flexlink pair candidate links (link 214 and 215).

In the network topology 200 shown in FIG. 2, it can be seen that (disregarding the alternate link 221 discussed above) there does exist a path between peer node 204 to peer node 206 without traversing the flexlink pair candidate links 214 and 215. Indeed, peer node 204 may reach peer node 206 via the connection to node 203, then to node 202, then to node 201, then to node 208, then to node 207, and then to peer node 206 over the respective links 213, 212, 211, 218, 217, and 216 as shown in FIG. 2. Referring back to FIG. 5, if it is determined that the peer nodes to the node under consideration are only linked in the network topology under consideration via the flexlink pair candidates, then at step 540 it is determined that the flexlink pair candidates cannot be enabled, and the routine ends. On the other hand, if at step 530 it is determined that symmetry in connectivity exists from each of the flexlink pair candidate links, then the routine proceeds to the final step at step 550 as discussed in further detail in conjunction with FIG. 6. In this manner, it is assured that all nodes in the network topology are reachable in the event that the flexlink pair candidate is enabled while one of the links is disabled.

Figure 6:
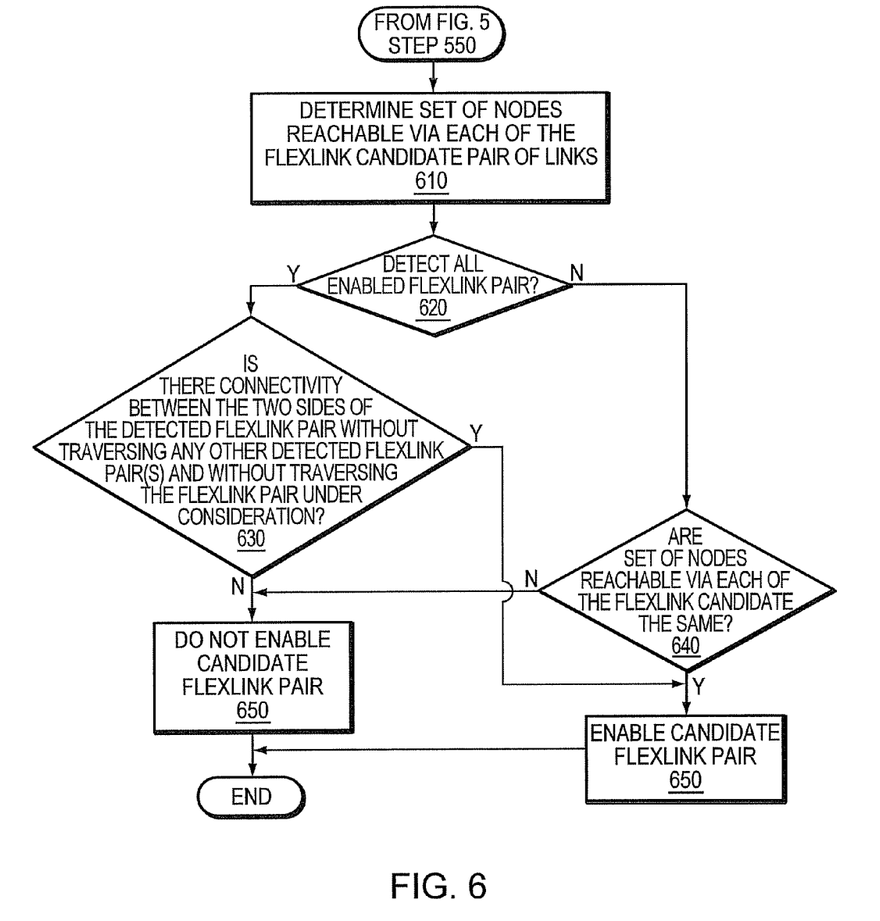
FIG. 6 is a flowchart illustrating the step of symmetrical reachability verification and confirmation of no conflicts of step 430 shown in FIG. 4 in accordance with still another embodiment of the present invention.

FIG. 6 is a flowchart illustrating the step of symmetrical reachability verification and confirmation of no conflicts of step 430 shown in FIG. 4 in accordance with one embodiment of the present invention. Referring to FIG. 6, at step 610 the set of nodes reachable via each of the flexlink pair candidates. For example, referring to the network topology 200 shown in FIG. 2, starting with the node under consideration (node 205), the set of nodes that are reachable through each of the flexlink pair candidates (links 214 and link 215) are determined.

During the determination of the node under consideration, it is determined whether an enabled flexlink pair is encountered at step 620. If it is determined that no enabled flexlink pair is encountered at step 620, then at step 640, the set of nodes that are reachable through each of the flexlink pair candidates are compared. For example, in the case of link 214, the set of nodes reachable via this link includes nodes, 204, 203, 202, 201, 208, 207 and 206. Further, in the case of link 215, the set of nodes reachable via this link includes nodes 206, 207, 208, 201, 202, 203, and 204. In other words, the set of nodes reachable via link 214 is the same as the set of nodes reachable via link 215. In such case when it is determined at step 640 that the set of nodes reachable via each of the flexlink pair candidate links (links 214 and 215 in this above example) are the same, then at step 660, it is determined that the flexlink pair can be enabled, and the central controller 130 (FIG. 1) configures the flexlink pair (links 214 and 215) for the node 205.

On the other hand, if at step 640 the set of nodes reachable via each of the flexlink candidates (links 214 and 215) are not the same, then it is determined at step 650 that the flexlink pair candidates cannot be enabled, and the routine ends.

Referring back to FIG. 6, at step 620 if an enabled flexlink pair is detected, then at step 630, it is determined whether there is connectivity between the two sides of the detected enabled flexlink pair without traversing the detected flexlink pair, or without traversing the flexlink pair candidates under consideration. More specifically, in this step, when an enabled flexlink pair is detected, the central controller 130 is configured to ensure that enabling the flexlink pair candidates for the node under consideration does not conflict with the detected enabled flexlink pair in the network topology.

For example, referring back to the network topology 200 shown in FIG. 2, assuming that the flexlinks is enabled on node 205 on links 214 and 215, and with node 201 under consideration with the links 211 and 218 being considered as flexlink pair candidates, the set of nodes reachable from node 201 via link 211 includes nodes 202, 203, and 204 at which point the enabled flexlinks on node 205 is encountered (link 214 and 215). Here, it is determined whether there is connectivity between nodes 204 and 206 without traversing the enabled and detected flexlink pair (links 214 and 215), or without traversing the flexlink pair candidates under consideration (links 211 and 218). It can be seen from FIG. 2 that there is no such connectivity between nodes 204 and 206. Thus, the nodes that are reachable via link 211 includes only nodes 202, 203 and 204. Similarly, the nodes that are reachable via link 218 includes only nodes 208, 207, and 206.

In other words, in the example above, the comparison of the sets of nodes that are reachable via flexlink pair candidate link 211 (nodes 202, 203, 204) is different from the set of nodes that are reachable via flexlink pair candidate link 218 (nodes 206, 207, 208). More specifically, referring to FIG. 6, at step 630, it is determined there is no connectivity between the two sides of the detected enabled flexlink pair without traversing the enabled flexlink pairs (links 214, 215) or without traversing the flexlink pair under consideration (links 211, 218). Accordingly, at step 650, it is determined that the flexlink pair candidate for the node under consideration (201) cannot be enabled as enabling it will create conflict with the enabled flexlink pair detected at step 620, and the routine terminates.

Referring back to FIG. 6, if however, it is determined at step 630 that there is connectivity between the two sides of the detected enabled flexlink pair without traversing the detected flexlink pair, or without traversing the flexlink pair candidates for the node under consideration, then there is symmetrical reachability between the two flexlink pair candidates, and accordingly, at step 660, the flexlink pair candidates may be enabled without causing any conflict with the detected enabled flexlink pair.

For example, referring back to the network topology 200 shown in FIG. 2, assuming as in the earlier example that flexlinks on node 205 are enabled (links 214 and 215), and with node 201 under consideration with links 211 and 218 as flexlink pair candidates, and further, there exists an alternate path 222 between nodes 204 and 207 as shown, the set of nodes reachable from each side of the flexlink pair candidate is determined. More specifically, the set of nodes reachable from node 201 (under consideration) via link 211 without traversing the enabled flexlink pair (links 214 and 215) or traversing the flexlink pair candidate for node 201 under consideration (links 211 and 218) include nodes, 202, 203, 204, and via the alternate link 222, nodes 206, 207, and 208. It can be seen that the set of nodes reachable via link 218 includes the same set of nodes again using the alternate path 222.

In this case, it can be seen that there is connectivity between the two sides of the detected flexlink pair without traversing the detected enabled flexlink pair, and without traversing the flexlink pair under consideration, and further, it is determined that there is symmetrical reachability between the two flexlink pair candidates (i.e., the set of nodes reachable via link 211 and the set of nodes reachable via link 218). Accordingly, the flexlink candidates (links 211 and 218) for the node under consideration (node 201) may be enabled in the network topology discussed above where another flexlink pair is enabled (links 214 and 215 for node 205).

In the manner described above, in accordance with the various embodiments of the present invention, there is provided method and system to automatically enable flexlink features in response to or based upon a dynamic modification to the network topology. In this manner, potential for undesirable loop formation in the data network due to a change in the network topology which is incompatible with the flexlink may be avoided. In this manner, without potentially deteriorating the integrity of the data network, flexlink feature may be safely and automatically activated and/or deactivated in a dynamic manner based on for example, the change in the network topology either due to loss of a link/node, and/or to the inclusion of additional links/nodes to the network.

Further, in accordance with the various embodiments of the present invention, no additional separate network configuration is needed to enable or disable the flexlink feature. Accordingly, with the central controller 130 provided to the data network 100 for the configuration of the data network 100 as well as to maintain the network integrity, and with the central controller 130 having full knowledge of the network topology at all times, and also being configured for notification of changes in the network topology, in accordance with the various embodiments of the present invention, potential for network down time and/or misconfiguration may be avoided or substantially eliminated without the potential the occurrence of transient loops in the network. Indeed, no network failure will result when an additional link is added to the network. Rather, the additional link is not activated, or alternatively, flexlink is first automatically disabled.

The various processes described above including the processes performed by the central controller 130 in the software application execution environment in the data network 100 including the processes and routines described in conjunction with FIGS. 1-6, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the central controller 130, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing dynamic link redundancy configuration in a data network, comprising the steps of:
    detecting a topology of a data network;
    determining a number of data paths from a node in the data network topology to each of a respective pair of peer nodes coupled to the node by a corresponding interface;
    determining a data path in the data network topology between the peer nodes;
    calculating a set of nodes reachable via each interface coupled to the node and the respective peer node in the data network topology, without traversing an enabled redundant link pair in the data network topology;
    comparing the set of calculated nodes reachable via each interface;
    based on identities of the set of calculated nodes reachable via each interface being the same, concluding that there is symmetrical reachability via each interface of the pair of interfaces; and
    in response to concluding that there is symmetrical reachability via each interface of the pair of interfaces, configuring the pair of interfaces as a redundant link pair for the node.

2. The method of claim 1 wherein the pair of interfaces include layer 2 interfaces.

3. The method of claim 1 wherein the step of configuring the pair of interfaces as a redundant link pair for the node in the data network, is further implemented in response to a determination that:
    the pair of interfaces are the only data path between the node and any of the peer nodes; and
    the pair of interfaces are not the only data path between the peer nodes.

4. The method of claim 3 wherein the redundant link pair includes a flexlink.

5. The method of claim 1 further including the step of detecting a change in the data network topology.

6. The method of claim 1 wherein the step of determining the number of data paths from the node to each respective peer nodes includes the step of verifying data network topology to avoid network loops.

7. The method of claim 1 wherein the step of determining the data path between the peer nodes includes the step of verifying network connectivity symmetry for each of the pair of interfaces for the node.

8. The method of claim 1 further including the steps of:
    detecting an enabled redundant link pair in the data network topology; and
    verifying connectivity between the two sides of the detected existing redundant link pair.

9. The method of claim 8 wherein the verifying step includes the steps of:
    confirming data network topology connectivity between the two sides of the detected enabled redundant link pair without traversing the detected enabled redundant link pair and without traversing the respective interfaces coupling the peer nodes to the node.

10. The method of claim 8 wherein the detected existing redundant link pair includes an enabled flexlink in the data network topology.

11. The method of claim 1 further comprising:
    disabling a Spanning Tree Protocol (STP) at the pair of interfaces configured as a redundant link pair for the node.

12. A method of dynamically configuring link redundancy in a data network, comprising the steps of:
    monitoring a topology of a data network;
    for each node coupled to a pair of peer nodes by a respective interface in the data network topology:
        determining a number of data paths from the node to each peer node;
        determining a data path between the pair of peer nodes;
        calculating a set of nodes reachable via each interface coupled to the node and the respective peer node without traversing an enabled redundant link pair in the data network;
        comparing the set of calculated nodes reachable via each interface;
        based on identities of the set of calculated nodes reachable via each interface being the same, concluding that there is symmetrical reachability via each interface of the pair of interfaces; and
        in response to concluding that there is symmetrical reachability via each interface of the pair of interfaces, configuring the pair of interfaces coupling the respective peer nodes to the node in the data network topology as a redundant link pair.

13. The method of claim 12 wherein the configuration step includes the step of enabling the pair of interfaces as a redundant link pair if:
    the pair of interfaces are the only data path between the node and any of the peer nodes;
    the pair of interfaces are not the only data path between the peer nodes; and
    the set of compared nodes reachable via each interface is the same.

14. The method of claim 13 wherein the redundant link pair includes a flexlink.

15. The method of claim 12 wherein each interface includes a layer 2 interface.

16. A system for providing dynamic link redundancy configuration in a data network, comprising:
    a controller unit configured to dynamically detect a data network topology, the controller unit further configured to:
        determine a number of data paths from a node in the data network topology to each of a respective pair of peer nodes coupled to the node by a corresponding interface;
        determine a data path in the data network topology between the peer nodes;

calculate a set of nodes reachable via each interface coupled to the node and the respective peer node in the data network topology without traversing an enabled redundant link pair in the data network;

compare the set of calculated nodes reachable via each interface; and based on identities of the set of calculated nodes reachable via each interface being the same, conclude that there is symmetrical reachability via each interface of the pair of interfaces;

in response to a conclusion that there is symmetrical reachability via each interface of the pair of interfaces, configure the pair of interfaces as a redundant link pair for the node.

17. The system of claim 16 wherein the pair of interfaces include layer 2 interfaces.

18. The system of claim 16 wherein the controller unit is further configured to configure the pair of interfaces as a redundant link pair for the node in the data network in response to a determination that:

the pair of interfaces are the only data path between the node and any of the peer nodes; and the pair of interfaces are not the only data path between the peer nodes.

19. The system of claim 18 wherein the redundant link pair includes a flexlink.

20. The system of claim 16 wherein the controller unit is further configured to:

detect an enabled redundant link pair in the data network topology; and verify connectivity between the two sides of the detected existing redundant link pair.

21. The system of claim 20 wherein when the controller unit is configured to verify connectivity, the controller unit is further configured to confirm the data network topology connectivity between the two sides of the detected enabled redundant link pair without traversing the detected enabled redundant link pair and without traversing the respective interfaces coupling the peer nodes to the node.

22. The system of claim 20 wherein the detected existing redundant link pair includes an enabled flexlink in the data network topology.

23. The system of claim 16 wherein a Spanning Tree Protocol (STP) is not operated at the pair of interfaces configured as a redundant link pair for the node.

24. A system for providing dynamic link redundancy configuration in a data network, comprising:

means for detecting a topology of a data network;

means for determining a number of data paths from a node in the data network topology to each of a pair of peer nodes coupled to the node by a corresponding interface;

means for determining a data path in the data network topology between the peer nodes;

means for calculating a set of nodes reachable via each interface coupled to the node and the respective peer node in the data network topology without traversing an enabled redundant link pair in the data network;

means for comparing the set of calculated nodes reachable via each interface;

means for concluding that there is symmetrical reachability via each interface of the pair of interfaces when identities of the set of calculated nodes reachable via each interface are the same; and means for configuring, in response to a conclusion that there is symmetrical reachability via each interface of the pair of interfaces, the pair of interfaces as a redundant link pair for the node.

* * * * *